U. SMITH.
Parallel Ruler.
No. 52,616.  Patented Feb. 13, 1866.
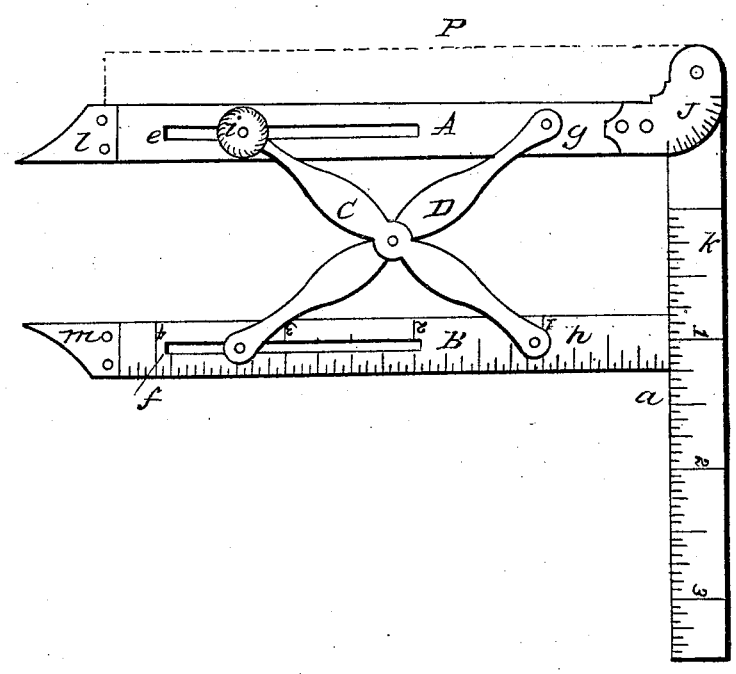

UNITED STATES PATENT OFFICE.

URIAH SMITH, OF BATTLE CREEK, MICHIGAN.

IMPROVEMENT IN PARALLEL RULERS.

Specification forming part of Letters Patent No. 52,616, dated February 13, 1866.

*To all whom it may concern:*

Be it known that I, URIAH SMITH, of Battle Creek, in the county of Calhoun and State of Michigan, have invented a new and Improved Instrument for Drawing Parallel Lines, designed also to be used by the draftsman and mechanic as a square, quadrant, calipers, and compasses; and I do hereby declare that the following is a full, clear, and exact description of the construction and operation of the same, reference being had to the annexed drawing, making a part of this specification, which drawing is a bird's-eye or vertical view of the instrument.

To enable others skilled in the art to make and use my invention, I will describe its construction and operation, as follows:

In the two parallel arms of the ruler A B, I form the slots $e\ f$, parallel to the edge of the ruler. Through these slots pass two pins from the ends of the cross-arms C D, suitably secured on the under side from slipping therefrom. The other extremities of the arms C D are pivoted to the arms A B at the points $g\ h$, and the arms C D being pivoted together at their center, and the points $g\ h$ being on an exact line with the slots $e\ f$, the arms A B are held continually parallel to each other. As the ruler is opened and closed the pins aforesaid traverse the slots $e\ f$.

To one of the parallel arms—for instance, A—a shank, $j$, is attached, to which is hinged the scale $k$. This shank is curved upward in such a manner as to allow the scale pivoted thereto to be folded over when not in use parallel to the ruler, as shown by the dotted lines $p$, or brought down against their ends at right angles, as illustrated in the drawing. To the ends of the arms A B hardened metallic points $l\ m$ are attached, for the purpose of using the instrument as calipers and compasses, and when so used the thumb-screw $i$ is designed to secure the arms in any desired position.

The advantages which I claim for this ruler are as follows:

First, the parallel ruler now in common use with mathematical instruments works diagonally across the page, and so away from the work of the operator. This ruler moves perpendicularly up and down the page to any distance.

Second, a ruler of any given length constructed in this manner will spread a greater distance than as ordinarily constructed, thus avoiding the necessity of frequently moving the lower limb while operating it.

Third, when the scale $k$ is in the position shown a convenient rule is always at hand, enabling the operator to draw his parallel lines at any given distance apart without the necessity of using another instrument to measure the distance.

Fourth, with the scale, as shown, a right angle is formed at $a$, in which position the instrument may be used as a square by the mechanic in truing his timbers and by the student and artist in erecting their perpendiculars upon any given line or cutting it at right angles.

Fifth, by graduating the curved shank $j$ an angle of any required degree may be laid off as with a quadrant.

Sixth, a convenient instrument to be used as calipers and dividers is furnished by means of the points $l\ m$, the scale $k$ always showing the distance of the points from each other.

What I claim as my invention, and wish to secure by Letters Patent, is—

The slots $e\ f$, or their equivalents, in the parallel arms of the ruler A B, the cross-arms C D, the points $l\ m$, thumb-screw $i$, shank $j$, and scale $k$, all combined and arranged substantially as and for the purpose herein set forth.

URIAH SMITH.

Witnesses:
 LEONIDAS D. DIBBLE,
 HENRY H. BROWN.